United States Patent [19]

Blanc et al.

[11] Patent Number: 5,359,709

[45] Date of Patent: Oct. 25, 1994

[54] APPARATUS AND METHOD FOR PROVIDING MULTIPLE OPERATING CONFIGURATIONS IN DATA CIRCUIT TERMINATING EQUIPMENT

[75] Inventors: Alain Blanc, Tourrettes sur Loup; Sylvie Gohl-Roux, La Colle sur Loup, both of France; Gottfried Ungerboeck, Langnau a.A., Switzerland

[73] Assignee: International Business Machines Corporation, Armonk, N.Y.

[21] Appl. No.: 826,504

[22] Filed: Jan. 27, 1992

[30] Foreign Application Priority Data

Feb. 21, 1991 [EP] European Pat. Off. ........ 91480025.5

[51] Int. Cl.$^5$ .............................................. G06F 13/42
[52] U.S. Cl. .................. 395/200; 364/240.8; 364/940.81
[58] Field of Search ............... 395/800, 200; 379/443; 340/825.5; 370/24

[56] References Cited

U.S. PATENT DOCUMENTS

| 4,016,548 | 4/1977 | Lan | 364/DIG. 1 |
| 4,281,315 | 7/1981 | Bauer | 364/DIG. 1 |
| 4,597,073 | 6/1986 | Staples | 370/24 |
| 4,654,654 | 3/1987 | Butler | 340/825.5 |
| 5,239,580 | 8/1993 | Bruno et al. | 379/443 |

FOREIGN PATENT DOCUMENTS 0398729 11/1990 European Pat. Off. ..... H04L 27/00

OTHER PUBLICATIONS

NEC Research & Development, No. 92, Jan. 1989, pp. 33–37, K. Doi et al, "A Digital Signal Processor for Modem Application".
IBM Technical Disclosure Bulletin, vol. 31, No. 6, Nov. 1988, pp. 130–135, Armonk, N.Y., "Service Processor Architecture and Microcode Algorithm for Performing Console Customization Under Customer Control".
Tencon '87, 1987 IEEE Region 10 Conference, Seoul, 25–28 Aug. 1987, vol. 3, pp. 1312–1316, IEEE, New York, S. Gupta et al, "Microprocessor Based Multistandard Modem".

Primary Examiner—David Y. Eng
Attorney, Agent, or Firm—John J. Timar; Edward H. Duffield

[57] ABSTRACT

Multiple operating configurations in data circuit terminating equipment (DCE) are enabled through multiple queues stored in a random access memory and which are loaded with bits and characters coming either from data terminating equipment (DTE) or the telecommunications line. The DSP processor stores bits provided by a transmit circuit in a first queue, determines characters from the bits stored in the first queue based on a first transmission protocol and stores the characters in a second queue. A third queue is used by a control processor to store characters to be transmitted to a remote DCE. The DSP processor determines bits to be transmitted from the characters stored in a third queue based on a second transmission protocol, and stores those bits in a fourth queue. When the DCE is operating in a synchronous mode, the DSP processor determines PCM words for transmission based on the contents of the second queue and stores them in a fifth queue for transmission. Similarly, when the DCE switches to an asynchronous mode, the DSP processor determines PCM words based on the contents of the fourth queue and stores them in the fifth queue for transmission. A similar queue arrangement is provided for the receive circuitry of the DCE.

14 Claims, 7 Drawing Sheets

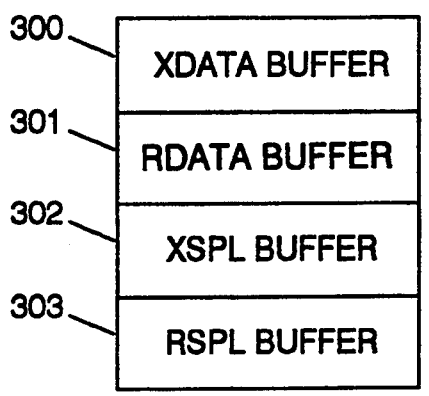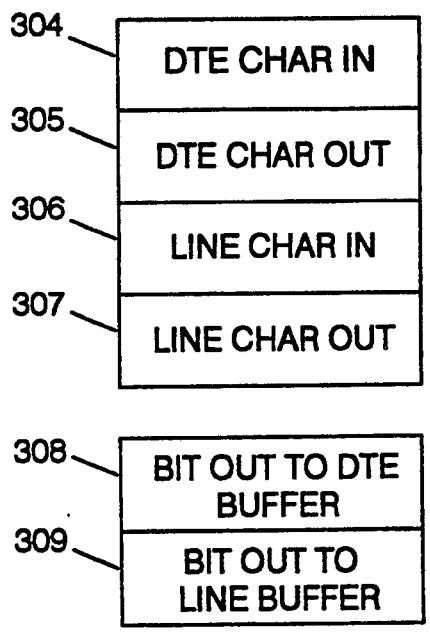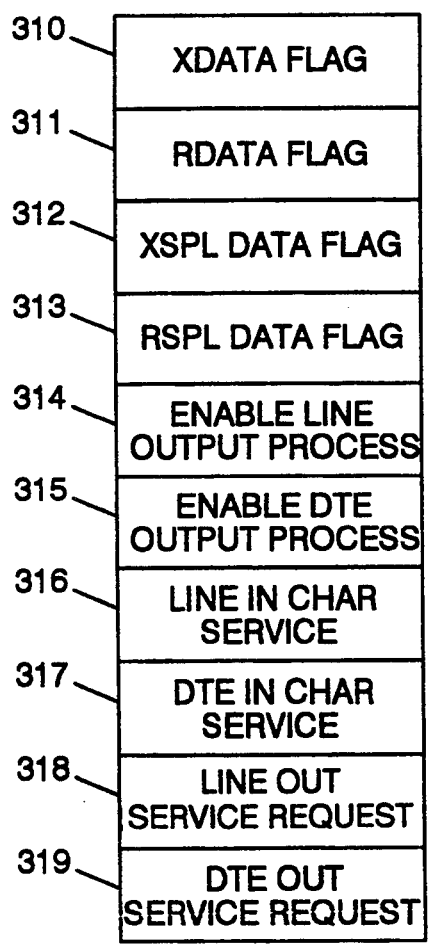
FIG. 3
INTERRUPT QUEUES
FLAGS

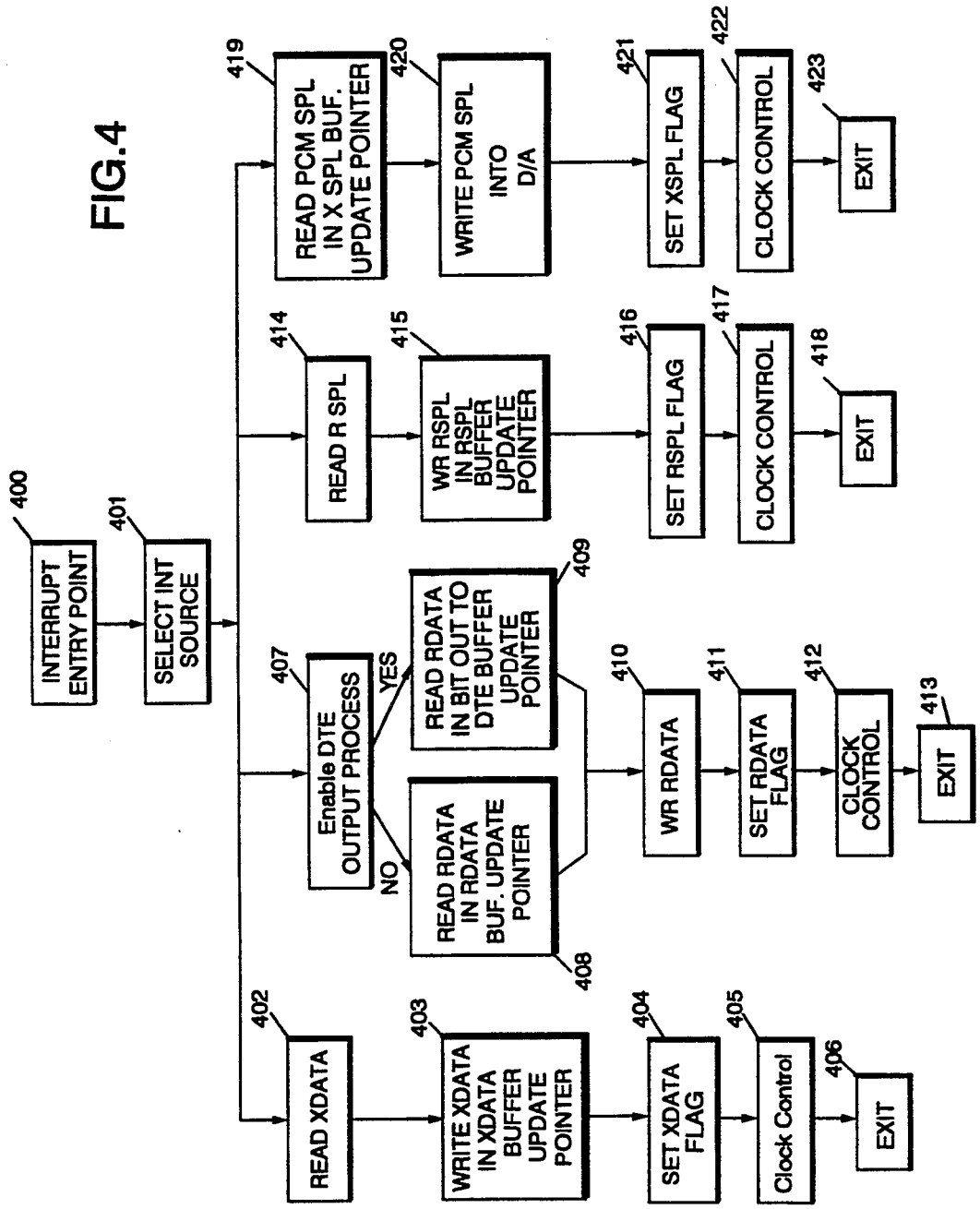

SUBROUTINE 1

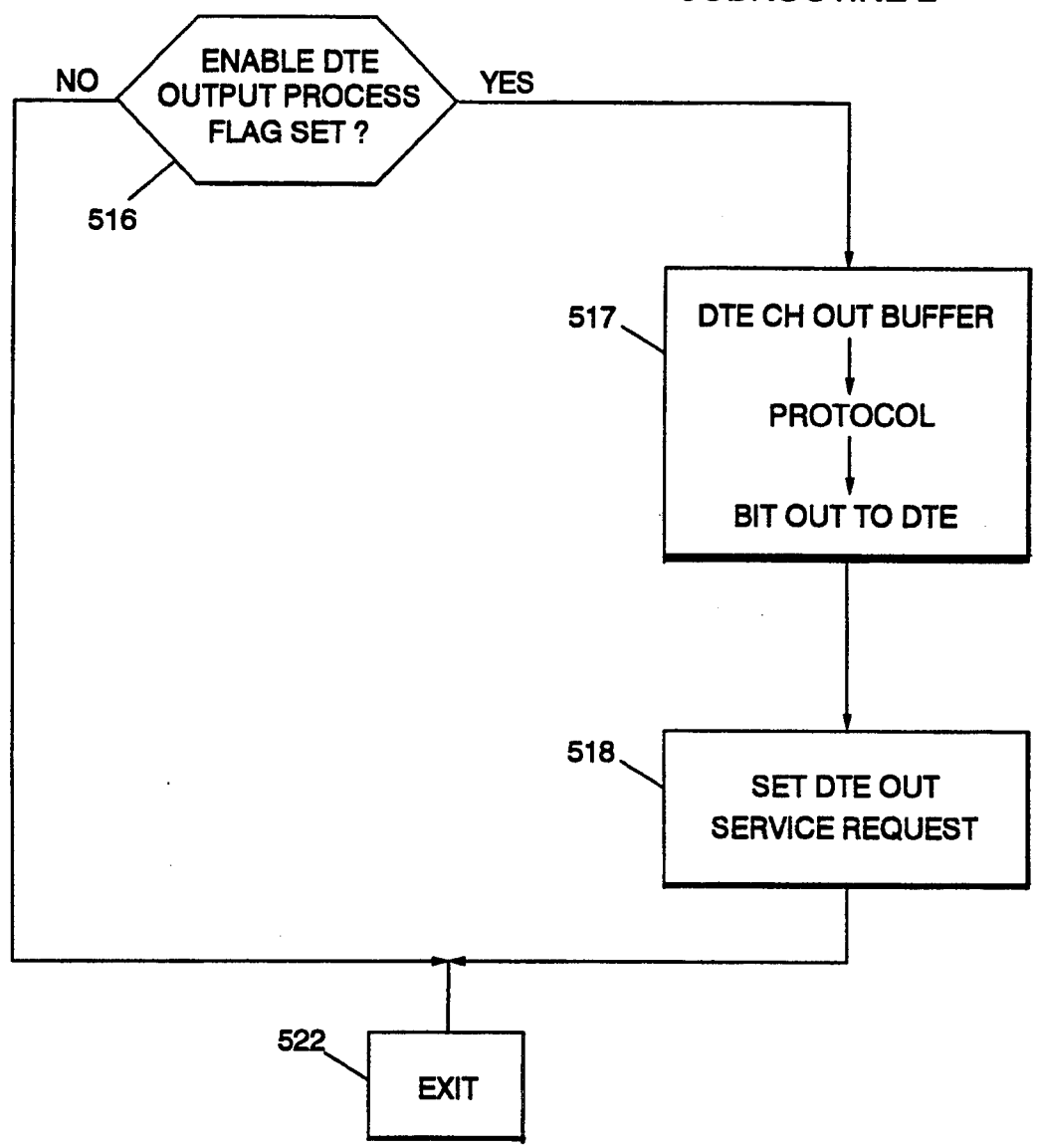

APPARATUS AND METHOD FOR PROVIDING MULTIPLE OPERATING CONFIGURATIONS IN DATA CIRCUIT TERMINATING EQUIPMENT

FIELD OF THE INVENTION

The invention relates to data communication systems and more particularly to the data circuit terminating equipment (DCE) or "modems" allowing multiple operating configurations.

PRIOR ART

DCEs which allow multiple operating configurations (for instance V25 bis, V42 . . . according to the CCITT requirements) exist in the art. Those DCEs include a first digital signal processor DSP assisted by a control processor processor used for handling the protocols, and more generally complex hardware circuitry ( including switches, registers, serial communication controllers) for managing the communication among two of the Data Terminating Equipments (DTEs) connected to the DCE, the control processor, the DSP processor and the telecommunication line in accordance with the considered protocol.

The latter circuitry involves a great deal of electronic components which inevitably increases the complexity and the cost of the modem.

Moreover, the great number of electronic components required in DCEs known in the art, jeopardize the possibility of integration of the DCE, particularly when the DCE is intended to be embodied in an interface card for a workstation, such as a personal computer.

Therefore a need exists for a simple DCE which does not require a great deal of electronic components while still allowing multiple operating.

OBJECTS OF THE INVENTION

It is an object of the invention to provide an apparatus for processing data in a DCE which supports multiple configurations without necessitating a great deal of electronic components.

It is another object of the invention to provide a DCE in which an internal control processor can easily intercept the sequence of data without requiring a complex electronic switch.

It is a further object of the invention to provide a low cost DCE supporting the CCITT V 25 bis, CCITT V42 bis, CCITT V22 bis, CCITT V32, and forthcoming V17, V32 bis, "V fast" recommendations and also providing control network management functions.

It is another object of the invention to provide a method for processing data conveyed through a DCE allowing multiple configurations.

BRIEF SUMMARY OF THE INVENTION

These and other objects of the invention are provided by means of a new organization of the communication between the different elements included in the DCE; particularly, the elements are a DSP processor used for the processing of data, a control processor for handling the communication protocols, the DTE and the telecommunication line. More accurately, the apparatus according to the present invention includes a memory in which are stored different queues respectively loaded with bits and characters coming either from the DTE and/or the telecommunication line.

By providing logical connections between the different queues, multiple telecommunication protocols are provided in a simple device.

The invention provides an improved DCE which is capable of operating in multiple configurations and without necessitating a great amount of electronic components. The DCE is therefore much more easy to integrate in an interface and for a workstation and even in a single chip.

The invention also provides an improved method for processing data in a DCE received either from a DTE or the telecommunication line connected thereto. The method involves the steps of creating different queues in a memory which respectively stores the bits and the characters received either from the DTE or the telecommunication line.

The logical connection between some of the queues by means of appropriate management of the associated memory address pointers permits the DCE to operate in accordance with multiple telecommunication configurations.

The apparatus that performs the processing of data in a DCE according to the present invention includes a digital signal processor DSP for processing the data transmitted between a Data Terminating Equipment (DTE) and a telecommunication line with transmit and receive circuits being connected to the DTE interface. The DCE further includes an A/D and a D/A converter, respectively, for converting the data from an analog form to Pulse Coded Modulation PCM words and from PCM words to an analog form. It also includes a control processor for controlling the communication protocols and a storage which is connected to both the DSP processor and to the control processor. The method is characterized in that it involves the steps of storing, by means of said DSP processor, the bits provided by said transmit circuit in a first queue in memory or storage and storing in a second queue, which is also located in the same storage, the characters being computed by said DSP processor, and a step of deriving from the bits stored in said first queue according to a given transmission protocol. The protocol can be either a start-stop, a HDLC or a BSC transmission protocol. The method further involves the step of storing in a third queue, which is located in the same storage as above, the characters provided by said control processor in order to transmit them to a remote DCE via the telecommunication line. A further step is involved which is the storing in a fourth queue, which is also located in the storage, the bits computed by said DSP processor and of deriving the characters stored in said third queue accordingly to a second given transmission protocol. The transmission of data through the telecommunication line is achieved by storing in a fifth queue the PCM words which are computed by said DSP processor in accordance with a given modulation algorithm, the PCM words being derived either from the contents of said first queue in synchronous mode or from the contents of the third queue when the transmit part of the DCE is intended to operate in an asynchronous mode or still when the control processor wishes to transmit data through the telecommunication line. The selection of an appropriate transmission protocol, which is chosen from existing protocols such as start-stop, HDLC, BSC, as well as the selection of the appropriate modulation algorithm which provide a method for processing data to be transmitted from a DTE to a telecommunication line, allow a large number of configurations without requiring the great number of electronic components which were usually necessary.

The invention also provides a method for performing the receive function of a DCE. In that case, the method involves the step of storing in a first queue, which is located in the storage, the characters being provided by the control processor in order to be transmitted to the DTE. The method involves the step of storing in a second queue, which is also located in the storage, the bits being computed by the DSP processor and deriving from the characters stored in the first queue according to a third given transmission protocol. In a third queue, also located in the storage, are stored the PCM words which are received from the A/D converter. The method further involves the step of storing by means of the DSP processor in a fourth queue also located in the storage, the bits which are computed by the DSP processor in accordance with a given demodulation algorithm, the computed bits being derived from the PCM words loaded in the third queue. In a fifth queue being also located in the storage, are stored the characters which are computed by the DSP processor and which are derived from the bits stored in the fourth queue according to a fourth given transmission protocol. The method according to the present invention further involves the step of transmitting to the receive circuit the bits coming from the fourth queue when the DCE operates in a synchronous mode, or from said second queue when the DCE operates in an asynchronous mode or still when the control processor wishes to transmit data to the DTE. Similarly as above, the choice of an appropriate transmission protocol such as the start-stop, HDLC or BSC protocol for the third or fourth transmission protocol provides, without necessitating a great deal of hardware component, the possibility of numerous operating configurations.

BRIEF DESCRIPTION OF THE DRAWINGS

FIG. 3 illustrates the arrangement of shared memory 204 in accordance with the present invention.

FIG. 4 details the interrupt routines operated in the DCE of the invention.

FIGS. 5A, 5B and 5C are views of a flow chart illustrating the background program executed by the DSP.

DETAILED DESCRIPTION OF THE PREFERRED EMBODIMENT OF THE INVENTION

Figure 1:
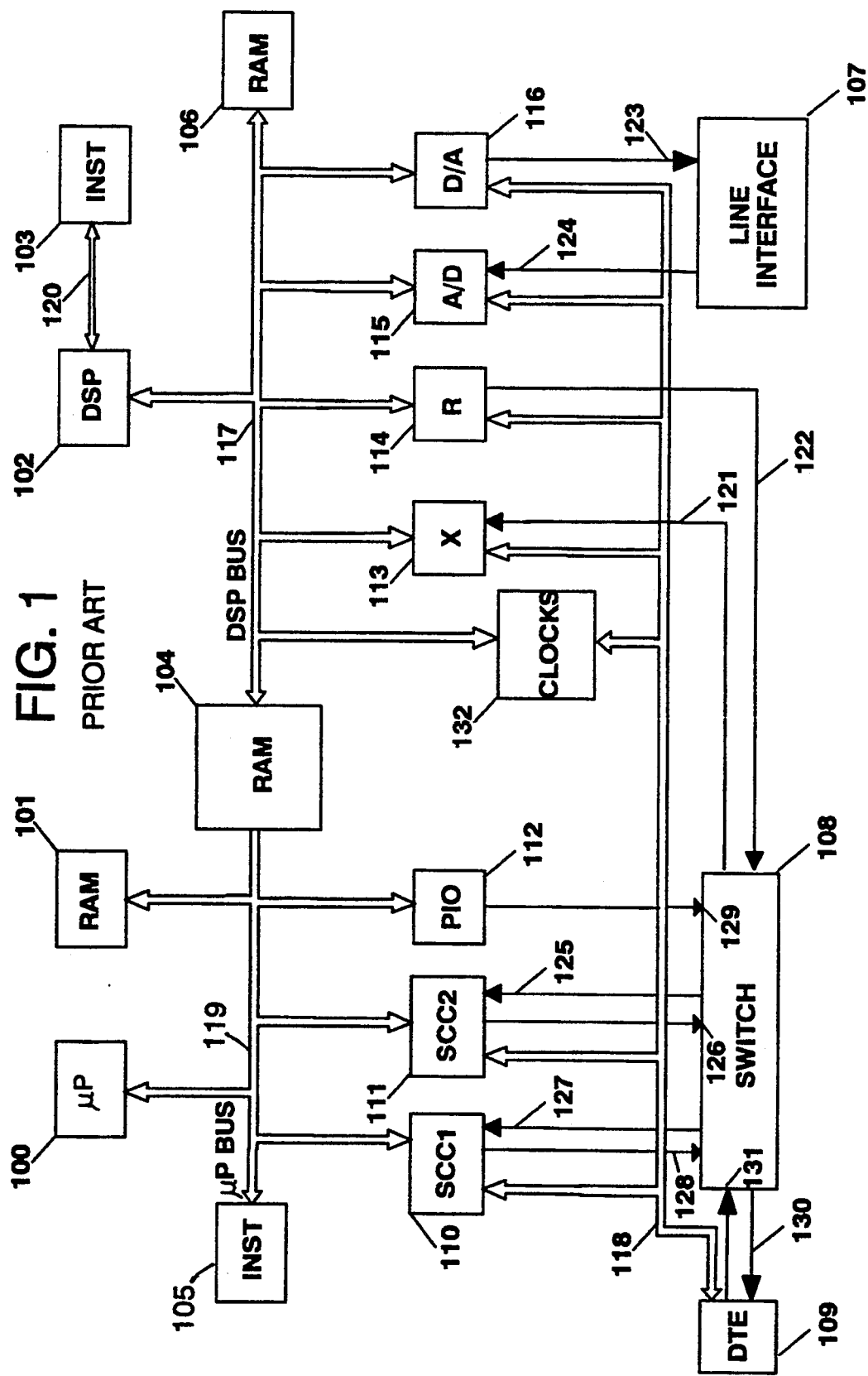
FIG. 1 illustrates a multiple-configuration DCE which is known in the art.

An example of a known DCE is illustrated with respect to FIG. 1 which includes a first processor 100 for controlling the protocols and a second processor 102 which is used for carrying out real time signal processing operations as well as bit flow control operations. For achieving this, processor 102 is generally a digital signal processor DSP having powerful signal processing capabilities. Processor 100 particularly provides functions in accordance with the CCITT requirements, for instance functions in accordance with the V25 bis, the V 42 bis and also LPDA2 functions (Control Network Management functions). For achieving this, processor 100 is associated with a PROM storage 105 which stores a set of program instructions and a RAM storage 101, both PROM storage 105 and RAM storage 101 being connected to a microprocessor $\mu p$ bus 119 connected to processor 102 that manages the signal processing functions such as those involved in the CCITT V22 bis modem (for full-duplex 2-wire transmission at a rate of 2400 bps) or in the CCITT V32 modem (in the case of full duplex two-wire transmission at a rate of 9600 bps). DSP processor 102 is connected via a DSP bus 117 to a ROM storage 103 and to a RAM storage 106. A serial communication controller SCC1 110 is connected to bus 119 and receives serial data on lead 127 from a switch 108 and generates data in series to the latter switch 108 on a lead 128. The appropriate clocks required for that purpose are provided on a clock bus 118 which distributes clock signals generated by a clock generator 132. The purpose of clock generator 132 is to provide on clock bus 118 all the required clock signals needed in the DCE and particularly the internal clock derived from an internal oscillator (not shown), the receive clock derived from the receive signal and also the external clock provided by DTE 109. SCC1 110 supports the traditional protocols known in the art such as SDLC (Serial Data Link Control) or BSC.

Similarly, a serial communication controller SCC2 111 is connected to bus 119 and receives serial data on a lead 125 from switch 108 and also transmits to switch 108 the serial data on a lead 126. A parallel Input/Output (PIO) circuit 112 is connected to bus 119 and permits control of switch 108 via leads 129. The control of switch 108 by processor 100 via PIO 112 allows the DCE to work in some different configurations. The generation of the control signals at the DTE interface (for instance Data Set Ready (DSR), carrier detect (CD) signals) are performed by processors 100 and 102. Switch 108 achieves the connection of the serial transmit data lead 131 and serial receive data lead 130 existing on the DTE interface (with respect to the CCITT V24 recommendation) to the different parts of the DCE in accordance with the chosen configuration as will be detailed hereinafter.

Switch 108 operates as follows: in the data transfer mode, transmit data lead 131 is connected to lead 121 and conversely lead 122 is connected to receive data lead 130. In this way, the data bits are directly transmitted and received from the telecommunication line to the DTE interface such as in a common datapump. In a second communication mode corresponding to a calling phase according to the V25 bis CCITT recommendation for a switched network, transmitted data lead 131 is connected to lead 127 and lead 128 is connected to received data lead 130. Processor 100 communicates with DTE 109 via SCC1 110 in accordance with the V25 bis protocol, and has the possibility to know the identity of the calling party etc. . . . As long as the calling phase does not complete, leads 121 and 122 remain unused since DSP processor 102 does not emit any data.

The complexity of the DCE, and particularly in terms of hardware components, increases further when the DCE is intended to work in a third mode which consists in the support of IBM's Link Problem Determination Aid-2 (LPDA-2) protocol since the second SCC2 111 and PIO 112 are particularly involved. The LPDA-2 facility (for detailed information, see the IBM document 'Link Problem Determination Aid', reference SY33-2064-0) defines the general rules of communication between the network and a DCE and particularly involves the transmission of Control Network Management (CNM) commands through the same telecommunication network, the CNM commands and the user data being transmitted through the same communication channel. In the LPDA2 mode, processor 100 controls switch 108 via PIO 112 so that transmitted data lead 131 is connected to leads 127 and 121 and received data lead 130 is connected to leads 122 and 125. Processor 100 continuously monitors, by means of SCC1 110, the data appearing on transmitted data lead 131 (and transmitted to lead 127) in order to detect the LPDA2 header.

Similarly, processor 100 continuously monitors, by means of SCC2 111, the data which are conveyed on leads 122/125 in order to detect the service message. At the detection of the LPDA2 header appearing on lead 127, processor 100 initiates the execution of a LPDA2 command by disconnecting leads 122 from received data lead 130 while leads 122 remained connected to leads 125, and also by connecting lead 128 with received data lead 130. Simultaneously, processor 100 disconnects lead 121 and transmitted data lead 131 and connects lead 126 to lead 121. From that instant SCC1 110 is connected to the DTE and conversely SCC2 111 is connected to the telecommunication line. Processor 100 then initiates by means of the latter SCC2 111 a service procedure with a given distant telecommunication equipment which is connected to the telecommunication network. That distant telecommunication equipment recognizes the service message by detecting on the data channel the LPDA2 header and consequently processes the service message. When processor 100 has received and stored the CNM data transmitted from the distant telecommunication equipment while executing the CNM service message procedure, processor 100 transmits the LPDA2 answer via received data lead 130 by means on SCC1 110 and returns to the mode-1 configuration which was described above. In a fourth telecommunication mode involving the V42/V42 bis CCITT recommendation, a phase of data transfer with error correction protocol is involved in response to a V25 bis calling phase. Processor 100 controls switch 108 by means of PIO 112 so as to switch from a V25 bis procedure to a V42 procedure. In order to perform the latter V42 procedure, the received data lead 130 is connected to lead 128, transmitted data lead 131 is connected to 127, lead 126 is connected to lead 121 and lead 122 is connected to 125. SCC1 110 is used in asynchronous mode while SCC2 111 is used in accordance with the SDLC protocol under control of processor 100.

In all the configurations listed above, the DSP processor 102 operates as follows: the serial data bits coming from lead 121 are deserialized by transmit block 113 which transmits them to DSP processor 102 in n-bit-packets in interrupt mode. Transmit block 113 is controlled by the transmit clock (i.e. internal or external according to the desired configuration) which is conveyed on clock bus 118. In accordance with the asynchronous V14 mode, transmit block 113 decodes the asynchronous characters. That is to say, it recognizes the start-bit and generates the deserialization clock. Receive block 114 generates interrupt signals to DSP 102 so that the latter generates a n-bit-word on DSP bus 117. Then Receive block 114 serializes, on lead 122, the n-bit-word at the rate of the receive clock existing on the clock bus 118. A digital-to-analog converter 116 receives the samples which have been computed by DSP processor 102 in accordance with the modulation algorithm, the latter modulation being pulsed by the Xmit sampling clock which is provided by clock generator 132 via clock bus 118. Similarly, an analog-to-digital converter 115 provides DSP processor 102 with samples at the timing of the receive sampling clock which is generated by clock generator 132 on clock bus 118. The analog signals which exist on leads 123 and 124 are transmitted to, or from, the line interface circuit 107 which eventually provides the appropriate coupling to the telecommunication line.

RAM 106 includes one buffer in storage 104 for every direction. Therefore, the Xmit bits provided by lead 121 are stored in a first queue in RAM 106 and are then processed by DSP 102 in order to generate the samples which are required by digital-to-analog converter 116 and, conversely the samples provided by the analog-to-digital converter 115 are processed by DSP processor 102, the latter processing providing bits which are stored in the second queue in RAM 106 before being transmitted to lead 122 via receive block 114. The interrupt signals appearing on DSP bus 117 which controls Xmit block 113 are synchronous with those controlling digital-to-analog circuit 116; similarly, the interrupt signals controlling receive block 114 are synchronous with those controlling analog-to-digital circuit 115. The shared buffer 104 connected to both bus 119 and bus 117 allows the exchange of commands between processor 100 and DSP processor 102 and particularly allows the exchange of the answers relating to the status of the DCE: call phase and data phase according to the CCITT V25 recommendation.

It therefore appears that the DCEs known in the art which are intended to permit multiple telecommunication configurations involve a complex and costly switch 108, a PIO 112 including many registers, the existence of two SCC circuits 110 and 111 and, more generally, a great deal of hardware circuits and electronic components.

Figure 2:
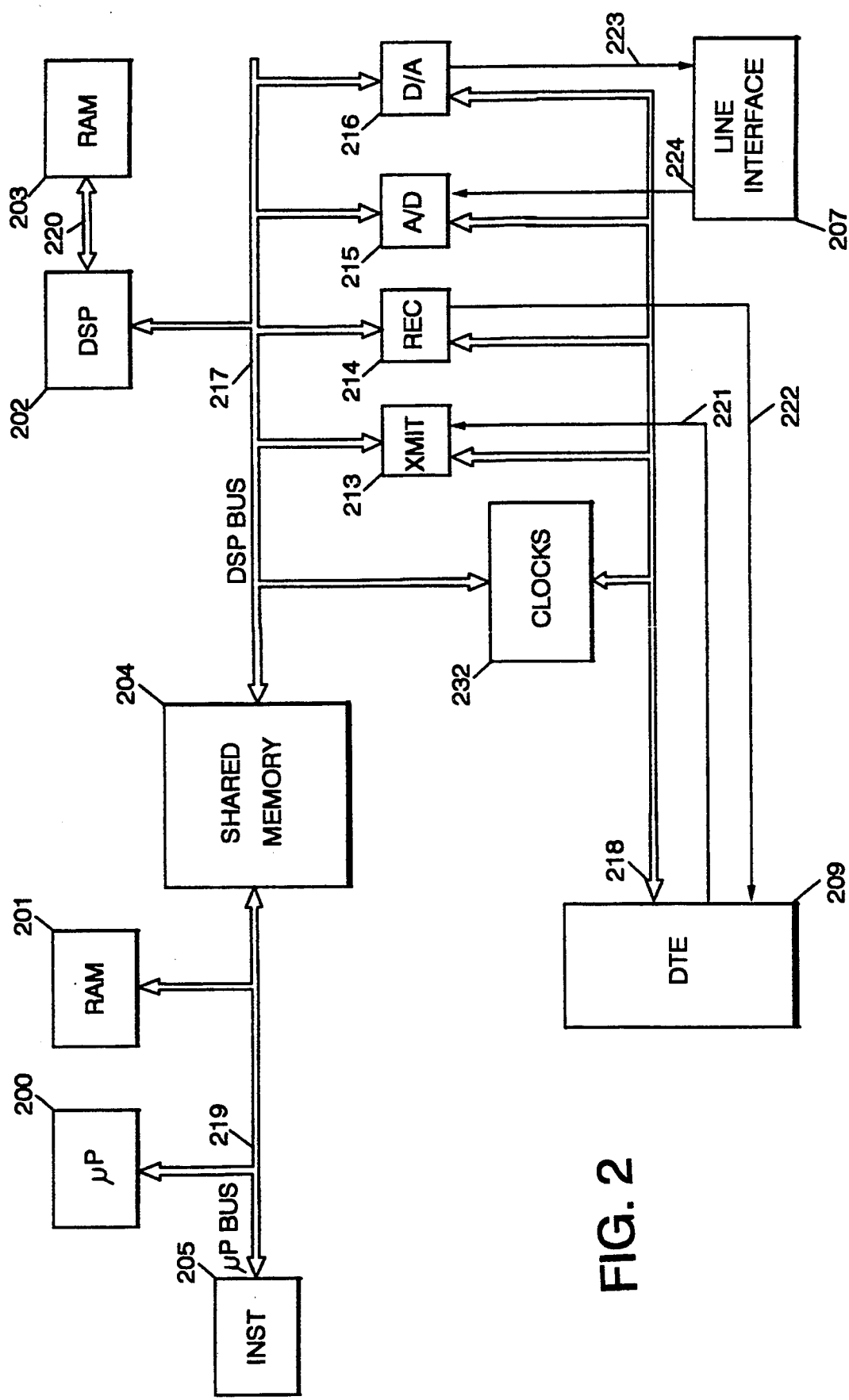
FIG. 2 illustrates a multiple-configuration DCE in accordance with the present invention

FIG. 2 shows the preferred embodiment of the multi-configuration DCE in accordance with the present invention. The DCE according to the invention includes a microprocessor 200 for controlling the protocols which is connected to a PROM storage 205 and a RAM storage 201 via a bus 219. A Digital Signal Processor (DSP) 202 connected to a PROM storage 203 via a bus 220 is used for carrying out real time signal processing operations as well as bit flow control operations. DSP processor 202 is connected via a DSP bus 217 to a shared RAM storage 204, the organization of which is described in detail by FIG. 3. RAM storage, Memory 204, is also connected to the data bus 219 in order to provide a logical connection between both processors 200 and 202. A clock generator 232 provides a clock bus 218 with all the needed clocks in the DCE, and particularly with an internal clock which is derived from an internal (not shown) oscillator, the receive clock which is derived from the receive signal and also the external clock which is provided at the DTE interface.

A Xmit block 213 deserializes the transmit data bits coming from lead 221 at the DTE V24 interface. When a n-bit packet is assembled, an interrupt for DSP processor 202 is generated to indicate to this processor that the n-bit packet can be read. Xmit block 213 is under control of the transmit clock provided on clock bus 218 (either the internal or external clock or receive clock in accordance with the desired configuration). According to the CCITT V14 Recommendation, Xmit block 213 also includes means for decoding the asynchronous characters; that is to say, for recognizing the start-bit and for producing the deserialization clock.

A receive block 214 generates interrupt signals to DSP processor 202 when it is to receive n-bit-words from DSP processor 202 on bus 217. Then Receive block 214 serializes, on lead 222, the n-bit-word at the rate of the receive clock which exists on the clock bus 218.

A digital-to-analog converter 216 receives the samples which have been computed by DSP processor 202 in accordance with the modulation algorithm, the latter modulation being pulsed at the rate of the Xmit sampling clock which is also provided by clock generator 232 on clock bus 218.

Similarly, an analog-to-digital converter 215 provides DSP processor 202 with samples at the timing of the receive sampling clock which is generated by clock generator 232 on clock bus 218. Finally, a line interface circuit (207) which is connected to analog-to-digital circuit 215 via a lead 224 and to digital-to-analog circuit 216 via lead 223 performs the appropriate coupling to the telecommunication line.

Effective timing arrangement circuits for controlling Xmit block 213, receive block 214, analog-to-digital circuit 215 and digital-to-analog circuit 216 are disclosed in EP-A-90480150.3 entitled "Data Circuit Terminating Equipment (DCE) Including Timing Arrangement Circuits Controlled by Processing Means" and assigned to the assignee of the present application and incorporated herein by reference.

Briefly, in accordance with EP-A-90480150.3, the control of those circuits is achieved by storing a number of digital values in appropriate registers Receive sampling (RS) time register (43), Transmit sampling (XS) time register (53), a transmit data (TD) register (33) and receive data (RD) time register (23). The content of every register is continuously compared to the content of a timer (60). Whenever the timer reaches the value stored in one register, RS time register (43) for example, analog-to-digital converter 215 performs a sampling of the analog signal appearing on lead 224. By programming the value stored in RS time register, DSP processor 202 can control the sampling transmit clock which pulses A/D circuit 215. More generally, by programming the appropriate digital values in each of said registers, the DSP processor can accurately control and adjust any clock which is used in the DCE without necessitating a large amount of clock dividers and electronic switches. Similarly, the DSP processor can accurately control the digital-to-analog conversion of a n-bit-word at the appropriate Xmit sampling clock by generating an appropriate sequence of digital values in the XS time register associated with D/A circuit 216. It should, however, be noticed that traditional clock control or timing arrangement circuits can be used for embodying the invention.

FIG. 3 illustrates the arrangement of shared memory 204 in accordance with the present invention. Shared memory 204 includes a first set of four buffers which are used for interfacing the interrupt routines to the background program which runs in the DSP 202 and which will be described in detail with respect to FIGS. 5A, 5B and 5C. A 'Xmit data' buffer 300 is used for receiving the bits coming from transmit data lead 221 at the DTE interface. A 'X Sp1' buffer 302 stores the PCM samples which will be converted into analog form by D/A circuit 216 and a 'R Sp1' buffer 303 stores the PCM samples which have been received from A/D circuit 215. A 'Receive data' buffer 301 is used for storing the bits which have been computed by DSP 202 from the contents of 'R Sp1' buffer 303 in accordance with the chosen demodulation algorithm. Shared memory 204 includes a second set of four buffers which are intended to store the characters for interfacing with control processor 200. A 'DTE Char in' buffer 304 stores the characters which are decoded from the contents of 'Xmit data' buffer 300 in accordance with the desired transmission protocol. A 'Line Char in' buffer 306 stores the characters which are decoded from 'Receive data' buffer 301 in accordance with the desired transmission protocol. A 'DTE Char out' buffer 305 is used for storing the characters to transmit to the DTE via the receive data lead 222. Those characters are converted in accordance with the desired transmission protocol into a series of bits which are stored in a 'Bit out to DTE' buffer 308. A 'Line Char out' buffer 307 stores the characters to transmit to the telecommunication line. The latter are converted in accordance with the desired transmission protocol into a series of bits which are then stored in a 'Bit out to line' buffer 309. Shared memory 204 also includes the following four flags which will be used for managing the different interrupt routines of FIG. 4 with the background program of FIG. 5 as will be described hereinafter: 'Xdata' flag 310, 'Rdata' flag 311, 'X Sp1 data' flag 312 and 'R Sp1 data' flag 313. Memory 204 further includes 2 flags which allow control processor 200 to control the function of the background program of FIG. 5: 'Enable line output process' flag 314, 'Enable DTE output process' flag 315; and four further flags which allow DSP processor 202 to indicate to control processor 200 that some operations have to be performed on buffers 304–307: 'Line in char service' flag 316, 'DTE in char service' flag 317, 'Line out service request' flag 318 and 'DTE out service request' flag 319.

The operating of the DCE in accordance with the present invention is described hereinafter with reference to the flow chart of the interrupt program given in FIG. 4 and the flow chart of the background program given in FIG. 5. Interrupt signals are generated on DSP bus 217 at the timing of the clocks which are chosen in accordance with the desired configuration and which are provided by clock generator 232. As mentioned above, if the clock control system is embodied in accordance with the timing arrangement circuits disclosed in EP-A-90480150.3, the interrupt signals will be generated at the output of the four comparators which are respectively used to compare the value reached by the timer and the value programmed by DSP processor 202 into the appropriate registers: XS time, RS time, RD time and TD registers (referenced 53, 43, 23 and 33). However, it should be noticed that a more conventional timing arrangement circuit can be used for embodying clock generator 232 (using switches, clock dividing circuits etc. . . ) Therefore, every n bits which are received at the DTE interface on lead 221, or which are to be transmitted to the DTE interface on lead 222, will cause clock generator 232 to generate an interrupt signal to DSP processor 202 via DSP bus 217. Whenever DSP processor 202 accepts the processing of the interrupt signal, the latter processor goes to the interrupt entry point, that is to say to the interrupt address which was assigned to it, step 400 of FIG. 4. Similarly, when a PCM word is available for carrying out an elementary D/A conversion in D/A circuit 216, or conversely when a PCM word has been calculated by A/D circuit 215, an interrupt is also generated and transmitted to DSP processor 202. Routine 401 allows the determination of the nature of the interrupt signal, i.e. which block among Xmit block 213, Receive block 214, A/D circuit 215 or D/A circuit 216 has generated the interrupt signal. To achieve this, the preferred embodiment of the invention includes an internal register (not shown) in which clock generator 232 can set data which characterizes the type of the interrupt.

In the case when the interrupt signal comes from Xmit block 213, DSP processor 202 goes to step 402 where it reads the n bits which were received at the DTE interface on lead 221 and assembled in one register included in Xmit block 213. Then, in step 403, DSP processor 202 loads the n bits into 'Xmit data' buffer 300 and updates the input-pointer which is associated with the latter buffer. Generally speaking, the loading and the unloading of one buffer among buffers 300–307 is respectively associated with the update of the input-pointer or output-pointer corresponding to that buffer. Step 404, DSP processor 202 sets 'Xdata' flag 310 which will be tested in the background program of FIG. 5. Step 405, the timing control and particularly the management of the Xmit clock is performed as traditionally. As mentioned above, the timing control can be embodied in accordance with the description given in EP-A-90480150.3. In the latter case, step 405 involves the computing of a digital value by DSP processor 202 which will be stored in the TD time register, the latter digital value fixing the occurrence of the next interrupt signal which will be generated and transmitted to DSP processor 202 by Xmit block 213. Step 406, DSP processor 202 exits the interrupt routine and goes back to the background program of FIG. 5.

In the case when the interrupt signal comes from Receive block 214, processor 202 goes to step 407 where it examines the status of 'Enable DTE output process' flag 315. If the latter flag is reset, in the case of a synchronous transmission, processor 202 goes to step 408 where it reads n bits from 'Receive data' buffer 301 and updates the corresponding output-pointer. In the case where the 'Enable DTE output process' flag 315 is set, DSP processor 202 performs a read operation of n bits from 'Bit out to DTE' buffer 308, step 409, and also updates the corresponding output-pointer. After the completion of step 408 or step 409, the process proceeds to step 410 where DSP processor 202 writes the n bits into the (not shown) register which is included in Receive block 214. Then, step 411, DSP processor 402 sets 'Rdata' flag 311. Step 412, the control of the receive clock is performed by processor 302 via clock generator circuit 232. It should be noticed that in the clock control as embodied in accordance with the description of EP-A-90480150.3, step 412 involves the computing by DSP processor 202 of a digital value which will be loaded into a RD time register which will determine the occurrence of the next interrupt signal which will be generated by Receive block 214 and transmitted to DSP processor 202. Step 413, the interrupt routine exits and the process goes back to the background program of FIG. 5.

In the case where the interrupt signal comes from A/D circuit 215, DSP processor 202 goes to step 414 where it reads the PCM sample which is stored in the (not shown) receive sampling register included into A/D circuit 215. In step 415, DSP processor 202 writes the latter PCM sample into 'R Sp1' buffer 303 and updates the (not shown) corresponding input-pointers. Then, in step 416, DSP processor 202 sets 'R Sp1 data' flag 313. Step 417, the process proceeds to the clock control step that is to say the control of the description sampling clock. Similarly as above, if that clock control step is to be embodied in accordance with the teaching of EP-A-90480150.3, step 417 involves the computing by DSP processor 202 of a digital value which will be loaded into a RS time register (referenced 43 in EP-A-90480150.3) which will fix the occurrence of the next interrupt signal which will be generated by A/D circuit 215 and transmitted to DSP processor 202. In step 418, the interrupt routine completes and DSP processor 202 goes back to the background program of FIG. 5.

In the case where the interrupt signal of step 400 comes from D/A circuit 216, DSP processor 202 goes to step 419 where it reads the PCM sample which is stored into 'X Sp1' buffer 302 and also updates the corresponding out-pointers. Then, step 420, DSP processor 202 loads the PCM sample into a (not shown) register included in D/A circuit 216. Step 421, DSP processor sets 'X Sp1 data' flag 312. Step 422 consists in the clock control and particularly the transmit sampling clock. As above, if the clock control is achieved in accordance with the teaching of EP-A-90480150.3, step 422 involves the computing by DSP processor of a digital value which will be loaded into a XS time register (reference 53 in the EP-A-90480150.3) which will determine the occurrence of the next interrupt signal which will be generated by D/A circuit 216 and transmitted to DSP processor 202. If a conventional clock circuit is used, step 422 involves the control of clock generator 232 by DSP processor, the latter clock generator 232 providing D/A circuit 216 with the required transmit sampling clock on clock bus 218. In step 423, the process completes and DSP processor 202 goes back to the background program of FIG. 5.

Figure 5A:
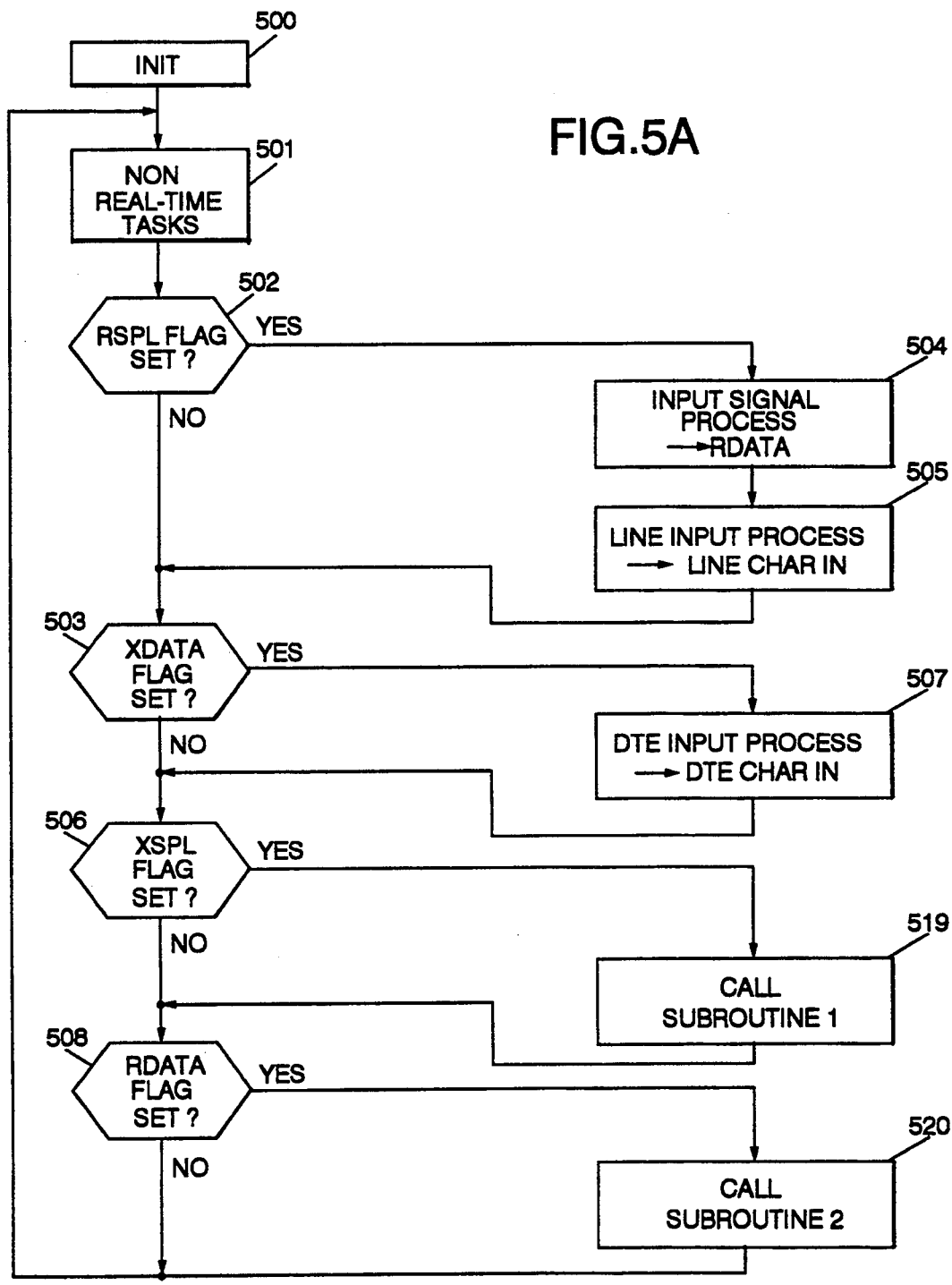
Figure 5B:
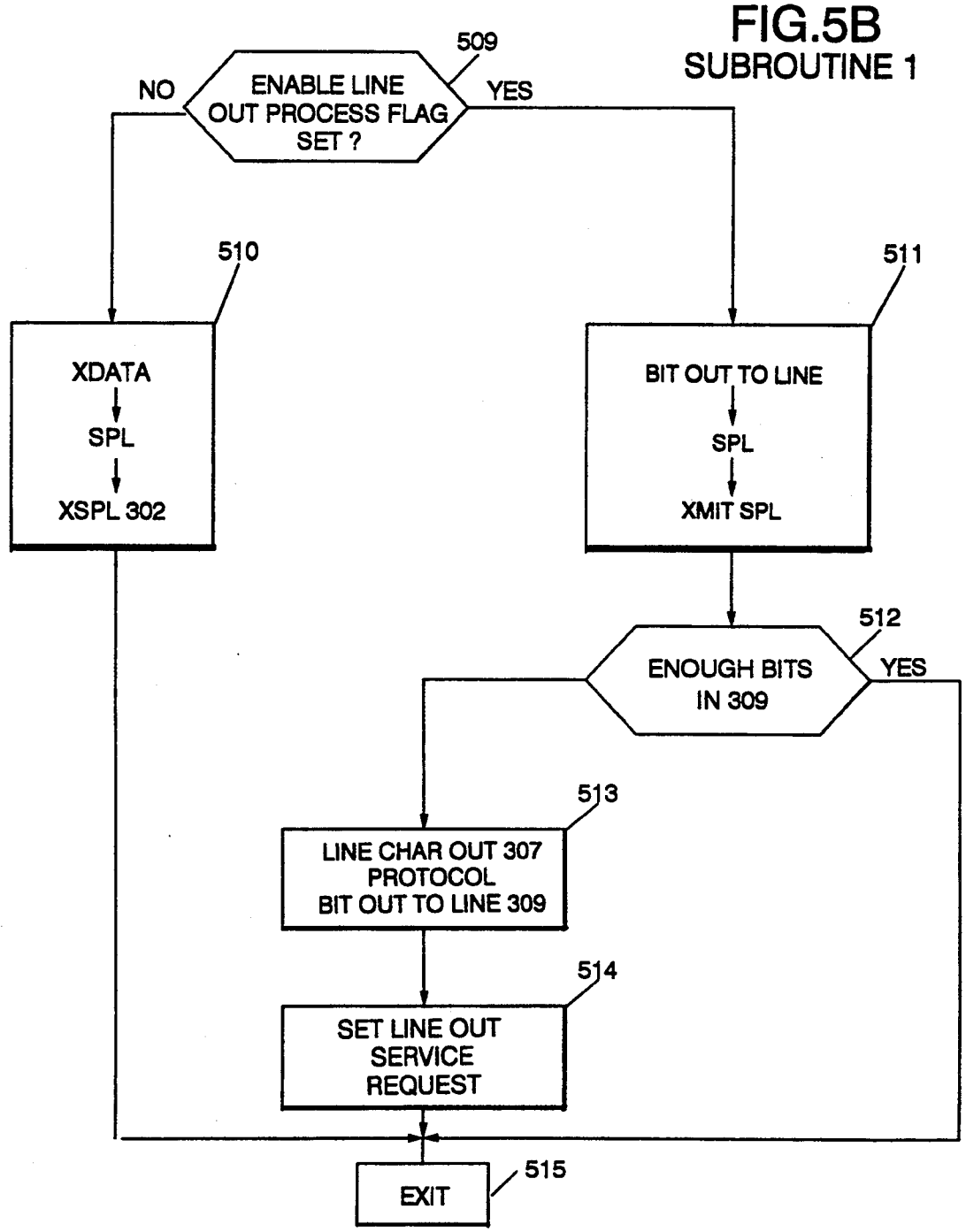

FIGS. 5A, 5B and 5C are flow charts illustrating the background program. The background program involves a first initializing step 500 which is performed after the power-ON of the DCE. Then, step 501 consists in the usual non-real time tasks which are traditionally performed by the DCE. The real-time tasks are performed by means of a scanner which successively examines flags 310–313 in order to carry out the corresponding actions. It should be noticed that the DSP processor 202 is chosen so as to prevent any contention between the different interrupt signals which are likely to be generated by transmit block 213, receive block 214, A/D circuit 215 and D/A circuit 216. More accurately, DSP processor 202 must be powerful enough so that it is not possible for any interrupt routine to set one among the flags 310–313 before the precedingly set flag has been processed by the background program. For that purpose, it could be advantageous to use some detection and correction mechanism known in the art, such as over-run and under-run mechanisms.

In step 502, the DSP processor 202 examines the status of 'R Sp1 data' flag 313. If the latter flag is set, then the process proceeds to step 504 where DSP processor 202 performs an elementary demodulation operation in accordance with the appropriate demodulation algorithm; for that purpose, DSP processor extracts a desired number of PCM samples from 'R Sp1' buffer 303 before processing them in accordance with the considered demodulation algorithm. Generally speaking, the number of PCM samples which are required depends on the nature of the demodulation algorithm, the number of samples per baud time and the characteristics of the filters. Step 504, DSP processor 202 derives an estimation of the received bits from the extracted samples and stores them into 'Receive data' buffer 301. Then, step 505, DSP processor 202 converts the latter bits into characters in accordance with the desired communication protocol, either synchronous or asynchronous, the latter characters being stored into 'Line Char in' buffer 306. Whenever a sufficient number of bits has been assembled, DSP processor 202 sets the 'Line in char service' flag 316 in order to indicate to control processor 200 that a full character is now available for further processing. DSP processor 202 then resets 'X Sp1 data' flag 312 and then proceeds to step 503. In the case when 'R Sp1 data' flag 313 is not set in step 502, processor 202 goes to step 503 where it checks the 'Xdata' flag 310: if the latter flag is not set, then the process proceeds to step 506 and in the reverse case it proceeds to step 507 where DSP processor takes the bits which are loaded into 'Xmit data' buffer 300 and builds, in accordance with the transmission protocol, the corresponding characters which are then stored into 'DTE Char in' buffer 304. Whenever one character has been fully assembled, DSP processor sets 'DTE in char service' flag 317 for informing control processor 200 that a character is available for further processing. DSP processor 202 then resets 'Xdata' flag 310 and then proceeds to step 506 where 'X Sp1 data' flag 312 is tested. In the case when the latter flag is set, then processor 202 executes subroutine 1 illustrated in FIG. 5b. Subroutine 1 first begins with step 509 where DSP processor 202 examines 'Enable line output process' flag 314. If flag 314 is reset, then the processor proceeds to step 510 where it performs an elementary modulation process in accordance with the modulation algorithm which is used. To achieve this, DSP processor 202 extracts the bits loaded into 'Xmit data' buffer 300 and computes the PCM samples, the number of which depends on the employed modulation algorithm, the number of samples per baud time and also the characteristics of the filters. Then, processor 202 loads the PCM samples into 'X Sp1' buffer 302 for further processing by the interrupt routines. Then DSP processor 202 proceeds to the exit step 515. On the contrary case, if flag 314 is found to be set in step 509, the process proceeds to step 511 where DSP processor 202 performs an elementary modulation operation in accordance with the considered modulation algorithm. For that purpose, DSP processor 202 takes the bits from 'Bit out to Line' buffer 309 and computes the PCM samples which will be then loaded into 'X Sp1' buffer 302. In step 512, a test is performed to determine whether the number of bits loaded into buffer 309 is sufficient for the next operation in accordance with step 511. This is achieved by examining the input and output pointers associated with the considered buffer. If the latter calculated number is found to be sufficient, then DSP processor 202 exits subroutine 1, step 515. If the latter number is not sufficient, then DSP processor 202 goes to step 513 where it takes the character which is stored into 'line Char out' buffer 307 and calculates, in accordance with the communication protocol being used, the bits before loading them into 'Bit out to line' buffer 309. Then, DSP processor 202 proceeds to step 514 where it sets 'Line out service request' flag 318 in order to inform control processor 200 that a next character to be transmitted is requested. Then DSP processor 202 proceeds to the exit step 515.

After the completion of subroutine 1, DSP processor 202 resets 'X Sp1 data' flag 312 and then reaches step 508. Step 508 is also performed in the case when 'X Sp1 data' flag 312 was reset in step 506. In step 508, DSP processor 202 tests the status of 'Rdata' flag 311. If the latter flag is found to be reset, then DSP processor 202 goes back to step 501. Alternatively, if the latter flag is found to be set, then DSP processor 202 executes subroutine 2 which is illustrated in FIG. 5C. Subroutine 2 starts with the test of 'Enable DTE output process' flag 315, in step 516. If the latter flag is reset, then DSP processor 202 exits subroutine 2, step 522. On the contrary, if the latter flag is set, then DSP processor 202 proceeds to step 517 where it takes the characters which are loaded into 'DTE Char out' buffer 305 and, in accordance with the communication protocol being used, calculates and derives the bits which are then loaded into 'Bit out to DTE' buffer 308 in the case where 'Bit out to DTE' buffer 308 was not found to be sufficiently loaded in step 409. This kind of situation will be more particularly described in the following examples. Step 518, DSP processor 202 sets 'DTE out service request' flag 319 in order to inform control processor 200 that a next character is requested. The process then exits subroutine-2, resets 'Rdata' flag 311 and then goes back to step 501 of the FIG. 5A.

It should be noticed that steps 504, 510 and 511 closely depend on the type of modulation which is chosen. Therefore, storage 203 has to include several software algorithms so that the DCE will be able to handle several types of modulation: a first software algorithm for implementing step 504 in accordance with the CCITT V22 bis Recommendation, a second software algorithm for the implementation of step 504 in accordance with the CCITT V32 Recommendation, a third for step 504 dedicated to the base-band modems etc. The steps 505, 507, 513 and 517 closely depend on the protocols being used, that is to say start-stop protocol, the SDLC (or HDLC) protocol, the BSC protocol. The multiple-purpose DCE (providing V25 bis, V42, V42 bis, LPDA2, V14, . . . ) should include a storage 203 in which are stored several software algorithms in accordance with the protocols being chosen. Therefore, if the DCE is intended to support the CCITT V42 recommendation, steps 507 and 517 should be according to the start-stop protocol while steps 505–513 should conform to the SDLC protocol (HDLC protocol). Moreover, 'Enable line output process' flag 314 permits the transmission of data coming directly from the data transmit lead at the V24 DTE interface on the telephone line. In addition, those data may also be generated inside the DCE in accordance with the CCITT V24 recommendation. Similarly, 'Enable DTE output process' flag 315 permits the transmission of data coming directly from the telephone line to the receive data lead of the V24 DTE interface. In addition, those data may also be generated inside the DCE, for instance if the control processor 200 wishes to send an answer to a V25 bis command via the receive data lead at the DTE V24 interface

We claim:

1. An improved data circuit terminating equipment for enabling multiple operating configurations (DCE) including a digital signal processor DSP (202) for processing data transmitted between a DTE (209) and a telecommunication line, transmit (213) and receive (214) circuits being connected to a DTE interface, an A/D converter (215) and a D/A converter (216) for respectively converting the data from an analog form to digital coded data and from digital coded data to an analog form, a control processor (200) for controlling a plurality of communication protocols and a memory (204) which is connected to both said DSP (202) and said control processor (200), the improved DCE comprising:

first means (202, 203, 403) for storing into a first queue (300) in said memory (204) a plurality of bits provided by said transmit circuit (213) for synchronous transmission, first means (202, 203, 507), cooperative with said first means for storing, for processing said plurality of bits stored into said first queue (300) and storing in a second queue in said memory (204) a first plurality of characters determined by said DSP (202) according to a first transmission protocol, second means (202, 203, 513) for storing into a third queue (307) in said memory (204 a second plurality of characters provided by said control processor (100) in order to be transmitted asynchronously to a remote DCE via the telecommunication line, second means (202, 203, 513), cooperative with said second means for storing, for processing said second plurality of characters stored into said third queue (307) and storing into a fourth queue (309) in said memory (204) a second plurality of bits determined by said DSP (202) according to a second transmission protocol, means (202, 203), cooperative with said first means for processing and storing and said second means for processing and storing, for generating digital coded data from said first plurality of characters stored in said third queue (307), and said second plurality of bits stored in said fourth queue, and storing said digital coded data into a fifth queue (302), said digital coded data being read from said second queue for synchronous transmission, and from said fourth queue for asynchronous transmission.

2. The DCE according to claim 1 wherein said first transmission protocol is chosen among the start-stop HDLC, BSC transmission protocols.

3. The DCE according to claim 1 wherein said second transmission protocol is chosen among the start-stop, HDLC, BSC transmission protocol.

4. The DCE according to claim 1 wherein said first transmission protocol is a start-stop protocol and said second transmission protocol is a HDLC protocol, whereby the transmission of data via the telecommunication line conforms to the CCITT V42 recommendation.

5. The DCE according to claim 1 wherein said data transmitted from said control processor (200) to a remote DCE via the telecommunication line are control network management commands.

6. A method for performing the processing of data in an improved data circuit terminating equipment (DCE) for enabling multiple operating configurations including a digital signal processor DSP (202) for processing the data transmitted between a data terminating equipment (DTE) (209) and a telecommunication line, transmit (213) and receive (214) circuits being connected to a DTE interface, an A/D converter (215) and a D/A converter (216) for respectively converting the data from an analog form to digital words and from digital words to an analog form, a control processor (200) for controlling a plurality of communication protocols and a storage (204) which is connected to both said DSP processor (202) and said control processor (200), the method comprising the steps of:

- storing (403) by said DSP processor (202) a first plurality of bits provided by said transmit circuit (213) for synchronous transmission into a first queue (300) which is located in said storage (204),
- processing said first plurality of bits stored in said first queue by said DSP processor to determine a first plurality of characters for synchronous transmission, said processing being performed according to a first transmission protocol,
- storing (507) said first plurality of characters for synchronous transmission into a second queue (304) which is located in said storage (204),
- storing (513) into a third queue (307) which is located in said storage (204) a second plurality of characters being provided by said control processor (200) in order to be transmitted asynchronously to a remote DCE via the telecommunication line,
- processing said second plurality of characters stored in said third queue by said DSP processor to determine a second plurality of bits for asynchronous transmission, said processing being performed according to a second transmission protocol,
- storing (513) said second plurality of bits for asynchronous transmission into a fourth queue (309) which is located in said storage (204),
- generating digital coded data based on a selected modulation algorithm by said DSP processor from the contents of said second queue for synchronous transmission and from the contents of said fourth queue for asynchronous transmission,
- storing said digital coded data into a fifth queue (302) by said DSP processor (202) said digital coded data being derived from the contents of said first queue (300) in synchronous mode or said third (307) queue in an asynchronous mode or when said control procesor (200) wishes to transmit data through the telecommunication line,
- transmitting said digital coded data stored in said fifth queue over the telecommunication line to a remote DCE.

7. The method according to claim 6 wherein said first transmission protocol is chosen among the start-stop, HDLC, BSC transmission protocols.

8. The method according to claim 6 wherein said second transmission protocol is chosen among the start-stop, HDLC, BSC transmission protocol.

9. The method according to claim 6 wherein said first transmission protocol is a start-stop protocol and said second transmission protocol is a HDLC protocol thereby the transmission of data via the telecommunication line conforms to the CCITT V42 recommendation.

10. The method according to claim 6 wherein said data transmitted from said control processor (200) to a remote DCE via the telecommunication line are control network management commands.

11. A method for performing the processing of data in an improved data circuit terminating equipment (DCE) for enabling multiple operating configurations including a Digital Signal Processor DSP (202) for processing the data received from a telecommunication line and transmitted to a Data Terminating Equipment (DTE) (209), transmit (213) and receive (214) circuits being connected to a DTE interface, an A/D converter (215) and a D/A (216) converter for respectively converting the data from an analog form to a Pulse Code Modulation (PCM) words and from PCM words to an analog form, a control processor (200) for controlling a plurality of communication protocols and a storage (204) which is connected to both said DSP processor (202) and said control processor (200), the method comprising the steps of:

- storing (517) by said DSP processor (202) a first plurality of characters in a first queue (305) which is located in said storage (204), the first plurality of characters being provided by said control processor (200) in order to be transmitted to said DTE (209),
- processing by said DSP processor said first plurality of characters stored in said first queue to determine a first plurality of bits according to a first transmission protocol,
- storing (517) said first plurality of bits in a second queue (308) which is located in said storage (204) for transmitting to said DTE (209),
- storing by said DSP processor (202) in a third queue (303) located in said storage (204), PCM words received from said A/D circuit 215,
- processing by said DSP processor said PCM words stored in said third queue to determine a second plurality of bits for transmission to said receive circuit (215),
- storing (504) by said DSP processor (202) in a fourth queue (301) located in said storage (204) said second plurality of bits,
- processing by said DSP processor said second plurality of bits stored in said fourth queue to determine a second plurality of characters according to a second transmission protocol,
- storing (505) by said DSP processor (202) into a fifth queue (306) which is located in said storage (204) said second plurality of characters,
- transmitting to said receive circuit (215) the second plurality of bit stored in said fourth queue (301) when operating in a synchronous mode, or said second queue (308) when operating in an asynchronous mode or when said control processor (200) wishes to transmit data to said DTE (209).

12. The method according to claim 11 wherein said first transmission protocol is chosen among the start-stop, the HDLC or the BSC transmission protocol.

13. The method according to claim 11 wherein said second transmission protocol is chosen among the start-stop, the HDLC or the BSC transmission protocol.

14. The method according to claim 11 wherein said first transmission protocol is a start-stop transmission protocol and said second transmission protocol is a HDLC transmission protocol whereby said DCE conforms to the CCITT V42 recommendation.

* * * * *